Patented May 22, 1923.

1,455,963

UNITED STATES PATENT OFFICE.

WALTER F. MEISTER, OF COLLINSVILLE, ILLINOIS.

LITHOPONE AND METHOD OF MANUFACTURE.

No Drawing.   Application filed July 25, 1921.   Serial No. 487,508.

*To all whom it may concern:*

Be it known that WALTER F. MEISTER, a citizen of the United States of America, residing at Collinsville, in the county of Madison and State of Illinois, has invented certain new and useful Improvements in Lithopone and Method of Manufacture, of which the following is a specification.

The object of my invention is to devise a means or method of manufacturing lithopone, and lithopone, which will be pure white in color and which will be sun-proof, that is nonphotogenic.

Lithopone is an artificial pigment. In the commercial article when used as prescribed, it turns darker in color when subjected to the sun's rays. Furthermore, it is not pure white immediately after its manufacture. My purpose is to produce a grade of lithopone which will not fade or discolor in sunlight and which will be pure white after manufacture and will remain pure white.

Lithopone commercially consists of 70% barium sulphate, and approximately 30% zinc sulphide, with from one-half of one per cent to three per cent zinc oxide. I use a portion of the conventional commercial process in my process and will therefore describe that commercial portion of my process. The barytes, which is a mineral well-known in mining, is heated with coal in a reduction furnace until the barium sulphate is reduced to barium sulphide which is commercially known as black ash and which is soluble in water. The barium sulphide is then leached in water and remains in solution.

The zinc sulphide which is a well-known mineral, is roasted and oxidized to form zinc oxide. As a matter of fact, metallic zinc or any zinc material soluble in sulphuric acid may be used. This zinc oxide or other zinc material is then dissolved in sulphuric acid and forms zinc sulphate. The zinc sulphate is purified in the usual manner to remove such impurities as affect the color of the finished product. The zinc sulphate must be free from chlorides.

The zinc sulphate is now added to the barium sulphide. As a result of the chemical re-action which ensues, barium sulphate and zinc sulphide are formed according to the following re-action.

$$ZnSO_4 + BaS = BaSO_4 + ZnS.$$

A white product in water results, which is filtered off and the precipitate is dried, which leaves the product in solid lumps. My process then begins.

These solid lumps are heated in a muffle or other suitable furnace in such a manner as to slightly oxidize the product, then removed, and quenched in water and a small percentage of zinc sulphate 5/10 of one per cent to ten per cent is added to the liquid, boiled, filtered, washed and dried. Other metallic sulphates may be used as is disclosed in my claims. No foreign salts, especially chlorides, should be added during calcination. The resulting product is pure white and has an immunity from the effects of the sun. This product can then be ground to the proper fineness and be used in the conventional manner as a pigment.

Applicant incorporates herein the part of the tables which are applicable to this specification, which tables appear in Gooch and Walker, part 2, page 9, edition of 1905 in the Outlines of Inorganic Chemistry. This is done in order to group the elements for the purpose of minimizing the number of divisions that are necessary in order to properly claim applicant's invention. These tables are as follows:—

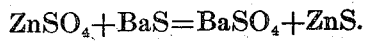

| Primary series. Groups. | Secondary series. Groups. |
|---|---|
| 1  2  3  4  5 | 1  2  3  4  5  6  7  8 |
| Li. | |
| Na. Mg. Al. | |
| K.  Ca. | Cu. Zn. |
| Sr.     Zr. | Ag. Cd.     Sn. |
|         Ce. Sb. | |
| | Hg.    Pb. |

What I claim and mean to secure by Letters Patent is:

1. The process of manufacturing lithopone which consists in adding a small percentage of one of the elements of group 2 secondary series to a mixture of barium sulphate and zinc sulphide.

2. The process of manufacturing lithopone which consists in adding a small percentage of a metallic sulphate in group 2 secondary series to a mixture of barium sulphate and zinc sulphide.

3. The process of manufacturing lithopone which consists in adding a metallic sulphate in group 2 secondary series which is soluble in water to a mixture of barium sulphate and zinc sulphide.

4. The process of manufacturing lithopone which consists in adding less than 5% by weight of one of the elements of group 2 secondary series to a mixture of barium sulphate and zinc sulphide.

5. The process of manufacturing lithopone which consists in heating a solid mass of barium sulphate and zinc sulphide in a muffle, removing, quenching in water and adding a small percentage of one of the elements of group 2 secondary series, boiling, filtering, washing and drying, in the order named.

6. The process of manufacturing lithopone which consists in adding a small percentage of zinc sulphate to a mixture of commercial lithopone.

7. The process of manufacturing lithopone which consists in adding a percentage of a metallic sulphate varying from 5/10 of one per cent to five per cent by weight to commercial lithophone.

8. A method of manufacturing lithopone which consists in adding a catalytic agent which consists of a metallic sulphate group 2 secondary series in the conventional process.

In testimony whereof I affix my signature.

WALTER F. MEISTER.